H. H. DUCHESNE.
MOTOR FOR PHONOGRAPHS AND LIKE MACHINES.
APPLICATION FILED AUG. 19, 1918.

1,335,566.

Patented Mar. 30, 1920.

INVENTOR
H. H. Duchesne
BY
ATTY

H. H. DUCHESNE.
MOTOR FOR PHONOGRAPHS AND LIKE MACHINES.
APPLICATION FILED AUG. 19, 1918.
1,335,566.
Patented Mar. 30, 1920.
2 SHEETS—SHEET 2.
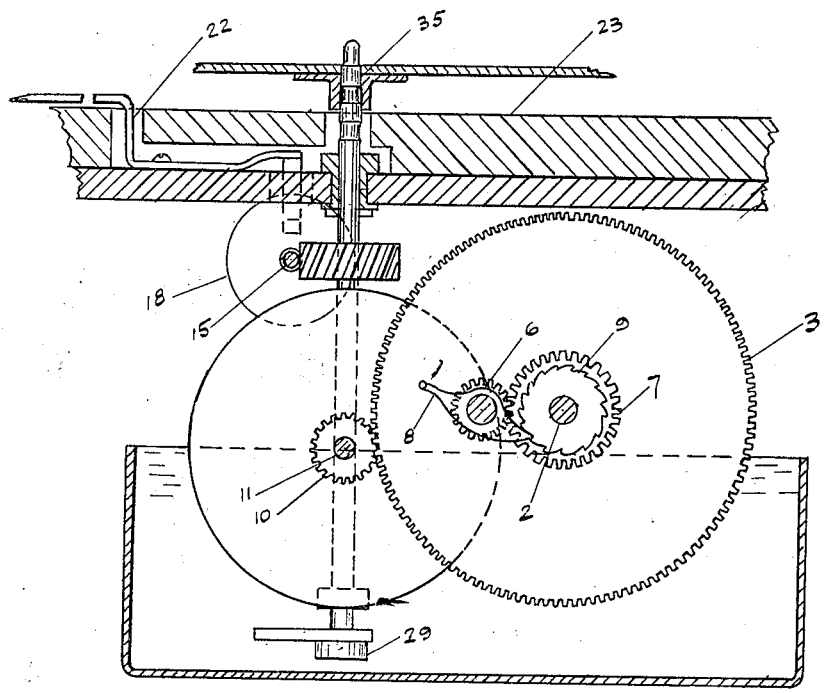
FIG. 3
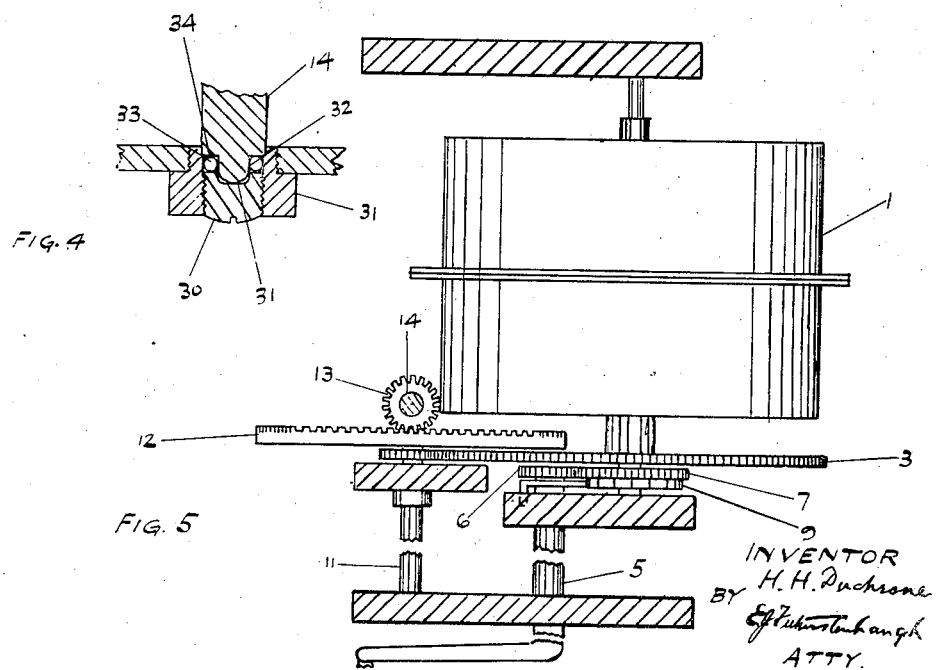
FIG. 4
FIG. 5
INVENTOR
H. H. Duchesne
BY
ATTY.

UNITED STATES PATENT OFFICE.

HENRI HORMIDAS DUCHESNE, OF MONTREAL, QUEBEC, CANADA.

MOTOR FOR PHONOGRAPHS AND LIKE MACHINES.

1,335,566.      Specification of Letters Patent.      Patented Mar. 30, 1920.

Application filed August 19, 1918. Serial No. 250,561.

*To all whom it may concern:*

Be it known that I, HENRI HORMIDAS DUCHESNE, a subject of the King of Great Britain, and resident of 1360 des Erables street, in the city and District of Montreal, in the Province of Quebec, in the Dominion of Canada, have invented certain new and useful Improvements in Motors for Phonographs and like Machines, of which the following is the specification.

The invention relates to improvements in phonograph motors, as described in the present specification and illustrated in the accompanying drawings that form part of the same.

The invention consists essentially of the novel construction and arrangement of parts, whereby the power is obtained with a minimum number of parts and adjustability, regulation and smooth running assured.

The objects of the invention are to devise a new assemblage of parts, that will insure the maintenance of the machine without the special care and attention of the user, to reduce materially the cost of manufacture and thereby benefit both the trade and the consumer, to increase the length of life of the instrument in its most efficient condition, to improve the operation of the machine by the reduction of the friction and generally to provide a simple, cheap, durable and serviceable machine.

In the drawings, Figure 1 is a front elevation of the gear mechanism and spring casings.

Fig. 3 is an end view of the gear mechanism and oil well.

Fig. 4 is a sectional detail of the shaft adjustable bearing.

Fig. 5 is a plan view of the gear mechanism omitting the regulator.

Like numerals of reference indicate corresponding parts in each figure.

Figure 1:
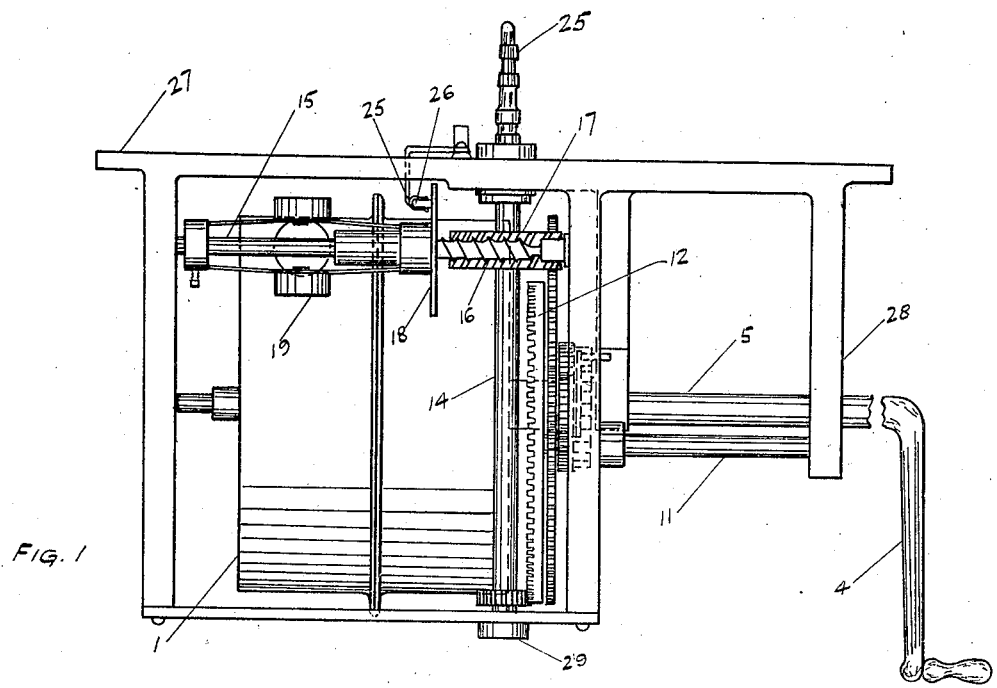
Figure 2:
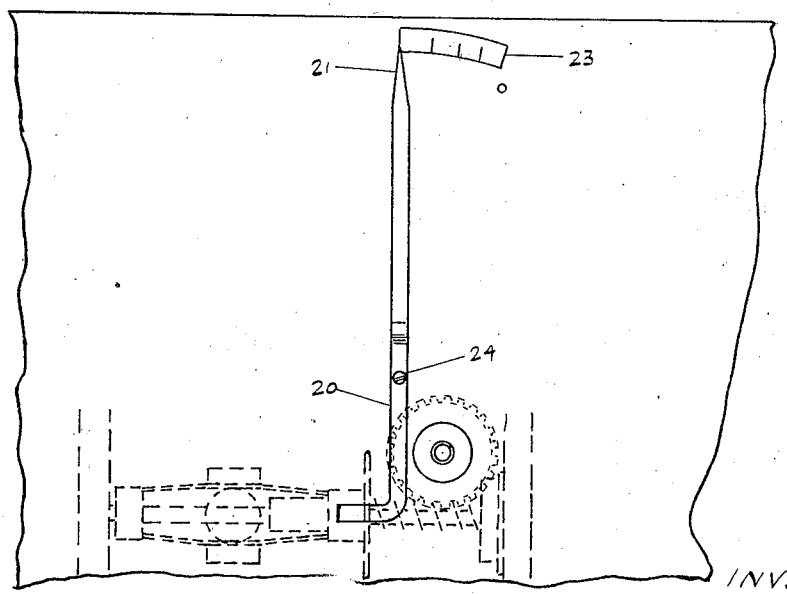
Fig. 2 is a plan view showing a fragmentary view of the table, the regulating hand and the regulating members in dotted lines.

Referring to the drawings, the springs 1 are secured to the shaft 2 and operate the gear wheel 3 fixedly mounted on said shaft.

The said springs are wound up by means of the crank handle 4, detachably secured to the winding shaft 5, on which is mounted the pinion 6, said pinion coacting with the gear 7 on the spring shaft. The pawl 8 on the pinion shaft 5 and the ratchet 9 on the spring shaft 2 avoid the reversal of rotation during the winding up of the springs as customary, for this part of the mechanism follows well known and well defined construction and only contributes to this invention.

The gear wheel 3 is the main driving wheel and carries with it in rotation the pinion 10.

The pinion 10 is mounted on the shaft 11 immediately behind the crown gear wheel 12. The crown gear wheel 12 coacts with a spur pinion 13 fixedly mounted on the vertical turntable shaft 14, thus completing a very simple chain of gears from the springs to the turntable shaft.

The worm shaft 15 is journaled at right angles to the turntable shaft 14 toward the upper end and carries the worm 16 coacting with the worm wheel 17 fixedly mounted on said shaft 14.

The brake wheel 18 is secured to the arms of the governor 19 and slides on said worm shaft 15.

The arm 20, having the pointer end 21, is offset at 22 and projects on to the phonograph case and along to the dial 23, said arm being pivoted at 24 and bent at the end 25. The brake shoe 26 faced with felt or other suitable material is carried by the bent end 25 and rubs the side of the brake wheel 18 for the double purpose of slowing and stopping the motor.

The shafts are all journaled in the frame 27, which contains the gearing, said frame having the extension 28, for supporting the winding shafts.

The ring 29 is screwed into a corresponding orifice in the bottom of the frame or otherwise attached and has a central threaded opening, in which is inserted the screw 30, the latter having recessed center 31 receiving the reduced end, 32, of the shaft 14, and surrounding said recess a ball race supporting the balls 33, which engage the annular shoulder 34 of said shaft 14.

It will be seen by this description that the lower reduced end of the shaft 14 meets the bed of the recessed center 31, therefore by screwing in said screw 30 the shaft 14 is raised, consequently the tapered tip 35 will rise correspondingly and as this engages the turntable, the taper may always be made to fit the socket in the turntable. This vertical movement of the shaft 14 is permitted by the driving and governor gearing as the spur gear of the driving gearing is located at the bottom of the crown gear and is movable transversely with respect to the same, and the worm wheel 17 of the governor gearing is movable transversely with respect to the worm 16.

The oil well 36 is secured to the frame 27 and several gears receive their oiling directly from said well, and these carry it to the other members of the mechanism.

In the operation of this mechanism, the springs are wound up as customary in spring motors, by the handle provided, and thus the motor is started, that is to say, the main drive wheel 3 is thrown in automatically in the usual manner in clock mechanisms and this turns the pinion and accompanying crown gear, the latter engaging the pinion on the turntable shaft and revolving said shaft and consequently the turntable.

The regulation and braking is done by the pointer arm, which is moved over the dial from the zero or stopped position to the graduation indicating the number of revolutions per minute desired.

The brake shoe at the inner bent end of the pointer arm engages the side face of the brake wheel and brings it and the worm shaft to a dead stop at any moment and as the worm meshes with a worm wheel fixed on the turntable shaft the whole mechanism must stop coincidently with the firm application of the brake shoe, though the mere rubbing of said shoe can be so regulated, as to give the various speeds desired.

Various changes may be made in this machine without departing from the spirit of the invention, so long as they are within the scope of the claims for novelty following.

What I claim is:—

1. In motors for phonographs and the like, a frame, a turntable shaft journaled in suitable bearings in said frame and adjustable upwardly and downwardly from its lower end, a spur pinion fixedly mounted on said shaft, and an actuating gear mechanism having a crown gear engaging said pinion and arranged to move transversely of the crown gear to permit a limited vertical adjustment of said vertical shaft without disengagement.

2. In phonograph motors, a vertical shaft suitably journaled, an actuating member, a driving gear wheel, a crown gear suitably journaled and rotating in a vertical plane adjacent to said shaft, a spur pinion mounted in proximity to the lower end of said shaft and coacting with said crown gear, and arranged to move transversely of the latter to permit vertical adjustment of the said shaft, and means for lubricating said gears.

3. In phonograph motors, a vertical shaft suitably journaled, an actuating member, a driving gear wheel rotating in a vertical plane and mounted on a horizontal shaft from said actuating member, a crown gear wheel mounted on a spindle in horizontal bearings at a lower level than said driving gear shaft, a pinion operatively connecting said gears, a spur pinion toward the lower end of said vertical shaft and coacting with said crown gear for driving said vertical shaft, said spur pinion being movable transversely of the crown gear to permit vertical adjustment of the vertical shaft, and an oiling system.

4. In phonograph motors, a vertical shaft suitably journaled, an actuating member, a driving gear wheel, a spur pinion near the lower end of said vertical shaft, a worm wheel toward the upper end of said vertical shaft, a crown gear mounted on a spindle and rotating in a vertical plane, coacting with said spur pinion and reaching upwardly into proximity with said worm wheel, a pinion on said crown gear spindle and driven by said driving gear, a governor, a governor shaft journaled in horizontal alinement with said worm wheel, a coacting worm driving said governor shaft, said spur pinion and worm gear being movable transversely of the crown gear and the worm respectively to permit vertical adjustment of the said vertical shaft, a brake wheel mounted on the governor shaft and a regulating lever having a laterally offset end bent downwardly and inwardly and shod on the inner end to engage said brake wheel.

5. In phonograph motors, a frame, a vertical shaft journaled in suitable bearings, a spur gear mounted near the lower end of said shaft, a crown gear suitably journaled and coacting with said spur gear, an actuating member, a driving gear operatively connected to said crown gear, a horizontal governor shaft near the upper part of the frame, a governor on said governor shaft, a worm and wheel mechanism operating from said vertical shaft near the upper end thereof, said spur gear and worm wheel being movable transversely of the crown gear and the worm respectively to permit vertical adjustment of the said vertical shaft, and an oil well submerging the lower parts of the vertical gears and the lower spur pinion.

Signed at the city of Montreal, Quebec, Canada, this 7th day of August, 1918.

HENRI HORMIDAS DUCHESNE.